United States Patent

[11] 3,553,385

[72] Inventors Dennis J. Morgan
Westerville;
Carl C. Nielson, Granville, Ohio
[21] Appl. No. 766,753
[22] Filed Oct. 11, 1968
[45] Patented Jan. 5, 1971
[73] Assignee Bell Telephone Laboratories, Incorporated
Murray Hill, N.J.
a corporation of New York

[54] QUEUING AND AUTOMATIC RETRY ARRANGEMENTS FOR COMMUNICATION SYSTEMS
10 Claims, 5 Drawing Figs.

[52] U.S. Cl. .......... 179/18
[51] Int. Cl. .......... H04m 3/48
[50] Field of Search .......... 179/27.2C, 27.1, 18CW

[56] References Cited

UNITED STATES PATENTS 2,534,500 12/1950 Claesson et al. .......... 179/18(.1)
2,885,482 5/1959 Baker .......... 179/18(.211)
2,921,138 1/1960 Baker et al. .......... 179/18(.211)
3,415,954 12/1968 Kandel et al. .......... 179/18CW
2,819,345 1/1958 Nilsson.
3,214,523 10/1965 Hess.
3,334,191 8/1967 Arseneau et al.
3,381,095 4/1968 Baker et al.
3,505,481 4/1970 Strobelt et al.

FOREIGN PATENTS 1,131,129 10/1968 Great Britain ..........
1,249,357 9/1967 Germany ..........

*Primary Examiner*—William C. Cooper
*Attorneys*—R. J. Guenther and James Warren Falk

ABSTRACT: A switching system is arranged with control circuitry including a processor to store call completion information for subsequent automatic retry purposes on calling connections which are not completed initially. When a connection is blocked because of the unavailability of trunk circuits the completion information is stored in a high queue list; and when a trunk is available but the call blocks in a subsequent office or blocks because the called station is busy the completion information is stored in a low queue list. Calls are retried from the high queue list whenever a trunk becomes available and retried from the low queue list under periodic clock control. During the queuing interval the calling subscriber's line remains free for the origination or the termination of other connections.

INVENTORS: D. J. MORGAN
C. C. NIELSON
BY: Brendan A. Ward
ATTORNEY

QUEUING AND AUTOMATIC RETRY ARRANGEMENTS FOR COMMUNICATION SYSTEMS

BACKGROUND OF THE INVENTION

1. Field of the Invention

This invention relates generally to switching systems and more particularly to switching network arrangements within such systems wherein calls which are not completed initially are stored in a memory and subsequently retried automatically under control of the switching network.

2. Description of the Prior Art

As communication between people and between machines becomes more sophisticated, an ever increasing dependence is placed upon the telephone switching system to establish reliable communication paths quickly and with a minimum of lost time. An example of such a situation is the establishment of communication links between computers, where even the slightest delay is costly.

In present systems, whenever a telephone connection is not completed to the called station, either because that station if off-hook or because the trunks between the stations are busy, busy tone is returned to the calling station. Consequently, the calling subscriber is required to periodically reinitiate the call in order to establish the desired communication link. However, the optimum reinitiation interval is dependent upon the reason for the inability of the switching system to complete the call, with a short interval being required in the case of an unavailable trunk and a significantly longer interval necessary when the called station is busy. Accordingly, the manual reinitiation of calls results in the inefficient utilization of a subscriber's time and is thus uneconomical in situations where it is necessary to establish numerous communication links.

In the prior art, systems are arranged to obviate the manual redialing of connections by storing or queuing the uncompleted calls in a memory associated with the called line. The queued calls are then completed to that line when the line becomes available. In these systems, since the queue is individually associated with the called line, no provision is made for the situation where the calling connection is blocked at a point in the switching network prior to the called station. For example, when all the trunks between the calling office and the called office are busy, the queue associated with the called line cannot be activated and the attempted call cannot be stored.

Other prior art systems have been designed to store all uncompleted calls in a queue and to retry each queued call periodically. However, in these systems the same problem exists as with manual retry arrangements; namely, that an arbitrary retry frequency must be selected which is acceptable for retry on calls blocked for any reason. The automatic retry frequency therefore is a compromise between the fast retry rate necessary when trunks are unavailable and the much slower rate desirable whenever the called station is off-hook. In addition, these systems are designed in such a manner that a linkage connection between the calling station and the switching system is maintained while the call is continually retried. The obvious disadvantage of such arrangements is that during the queuing interval the calling subscriber's line remains unavailable to place or receive calls involving other subscribers, thereby limiting the usefulness of the queuing feature. Thus, the prior art queuing arrangements do not provide for the automatic completion of blocked calls in an optimum manner consistent with the reason for the blockage, nor are there provisions made for releasing the linkage to the calling subscriber's station during the queuing interval.

In view of the foregoing, it is an object of this invention to provide a queuing arrangement which may be simply and economically implemented in existing communication switching systems so as to minimize the interval between the initiation of a call and the establishment of the completed connection.

It is a further object of this invention to provide a switching system for automatically completing initially blocked calls without additional effort on the part of the calling subscriber.

It is another object of this invention to provide a communication switching system for optimizing the automatic completion of blocked connections dependent upon the location within the system causing the blockage, which system maintains the calling subscriber's line free during the queuing interval for the origination or termination of other connections.

SUMMARY OF THE INVENTION

These and other objects are obtained in accordance with an exemplary embodiment of the invention wherein a number of subscriber stations are provided with a feature known as queuing. A plurality of queue registers are provided to give access to a queue store for the further processing of a blocked call. A queue processor and store (PAS) is associated with the switching office serving the calling station and the actual queue function is performed thereat. In the embodiment, the calling office is arranged to detect a busy condition of the equipment and to determine the underlying reason for the blockage; i.e., whether all outgoing trunks are busy, whether a necessary intermediate switching office is busy, or whether the called station is currently off-hook. The information necessary for the completion of the call is then recorded in a particular list within the queue store selectively determined from the reason causing the blockage. As an example, calls which are blocked due to the unavailability of a trunk are placed on a high queue (Hi-Q) list, whereas calls blocked because of the off-hook status of the called station are directed to a low queue (Low-Q) list. For retry purposes, each of the storage areas within the queue store is controlled separately. Calls which are stored in the Hi-Q area are subject to retry when a trunk becomes available, while calls which are stored in the Low-Q storage are retried periodically under clock control. Communication is thereby possible between the calling station and the called station with minimum delay and without requiring additional effort by the calling subscriber.

In accordance with one feature of the invention, a communication switching system is arranged with a processor and store for recording the call connection completion information of blocked calls in a queue in accordance with the reason for the blockage.

In accordance with another feature of the invention, a telephone switching system is arranged with a processor and store for queuing the connection completion information of blocked calls and responsive to the availability of trunk circuits for reinitiating those calls queued because of the unavailability of such trunks and responsive to periodic clock pulses for reinitiating those calls queued because of a busy condition on the called line.

In accordance with still another feature of this invention, a telephone switching system is arranged to interrogate the calling subscriber in order to determine whether a particular blocked call should be placed in a queue for subsequent automatic retry purposes.

In accordance with still another feature of this invention, a telephone switching system is arranged to store call completion information of blocked calls in a central memory for retry in accordance with the reason for the blockage while maintaining the calling station operable to receive and to originate other connections during the storage interval.

DESCRIPTION OF THE DRAWING

The foregoing objects, features and advantages, as well as others of the invention, will be more apparent from the following description of the drawing, in which.

Figure 2:
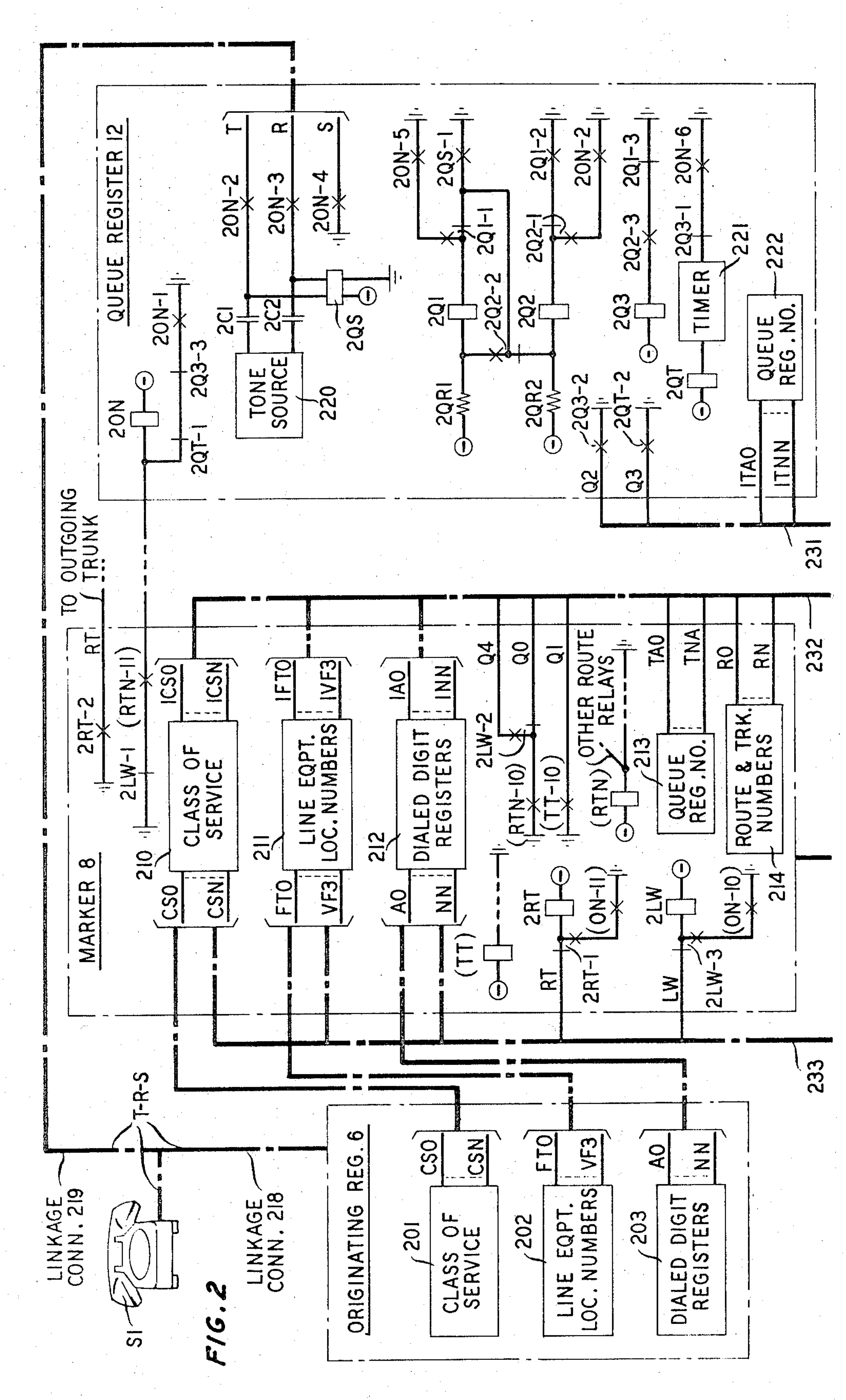
FIGS. 2 through 4 are schematic drawings showing in greater detail the interrelation of the components of the exemplary embodiment.
Figure 3:
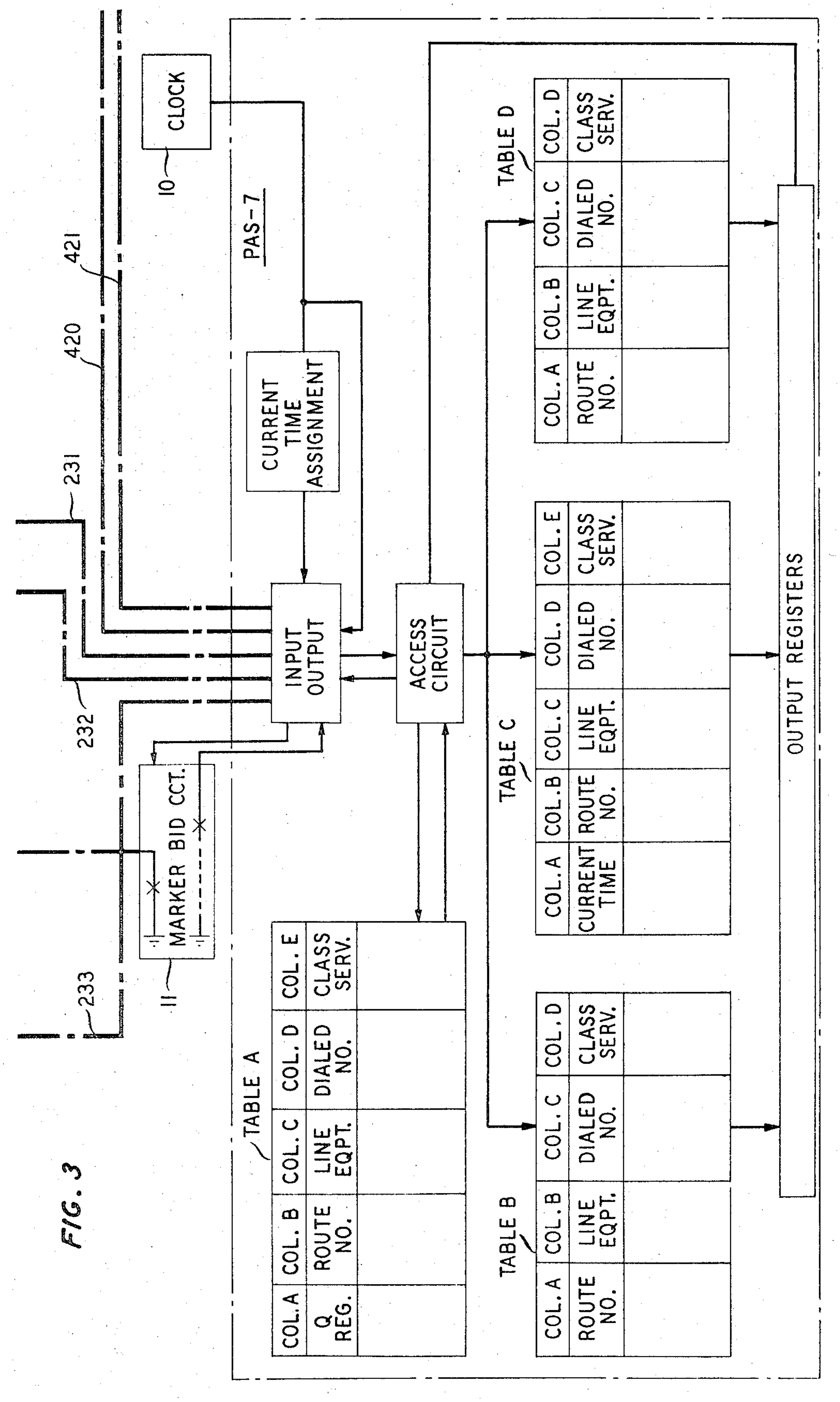
Figures 4, 5:
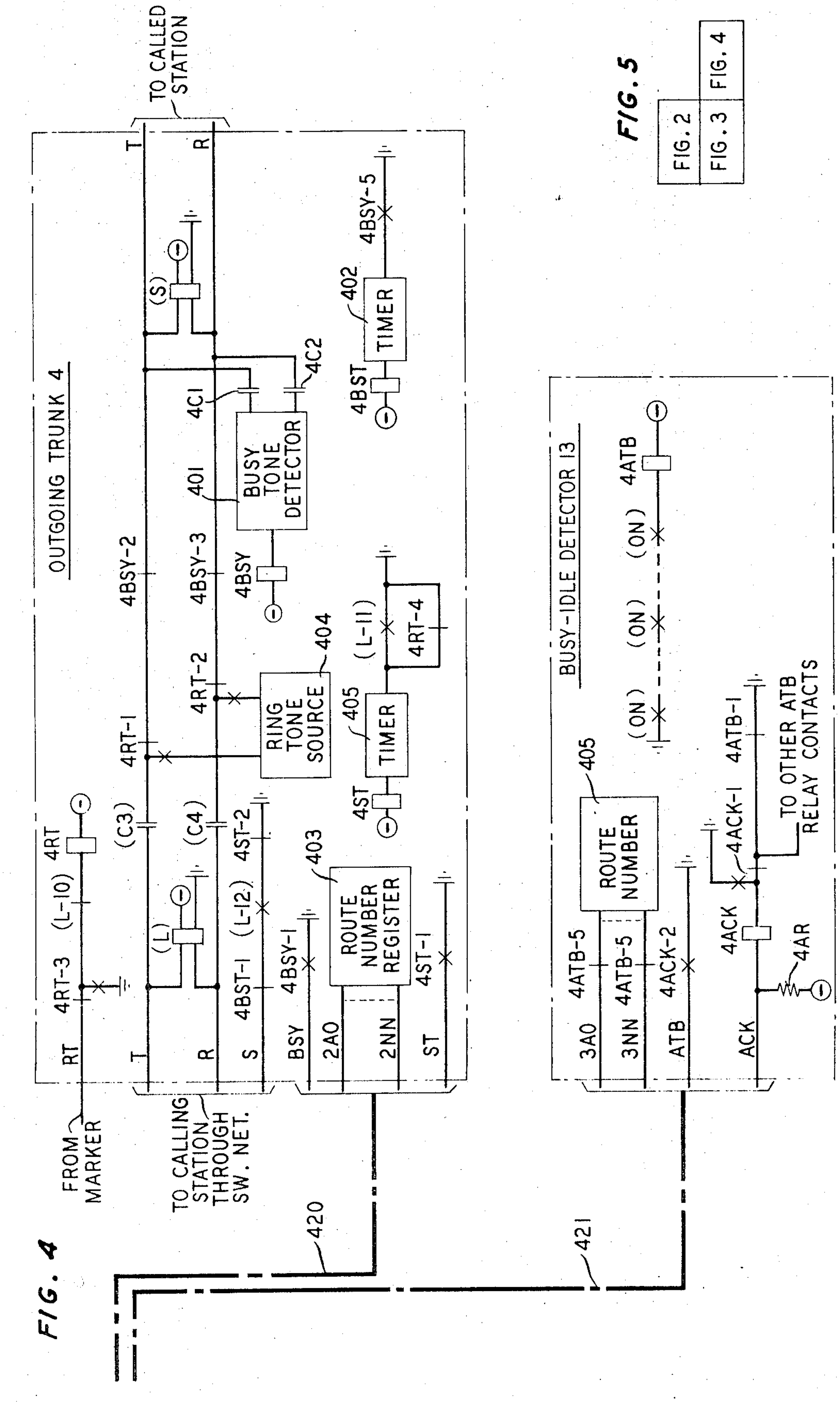
FIG. 5 shows the manner in which the other figures should be arranged.

It will be noted that FIGS. 2 through 4 employ a type of notation referred to as "detached contact" in which an "X" shown intersecting a conductor represents a normally open contact of a relay and a bar shown intersecting a conductor at right angles represents a normally closed contact of a relay; "-normally" referring to the unoperated condition of the relay. The principles of this type of notation are described in an article entitled "An Improved Detached Contact Type Schematic Circuit Drawing" by F. T. Meyer in the Sept. 1955 publication of the American Institute of the Electrical Engineers Transactions, Communications and Electronics, Vol. 74, pages 505—513.

It will also be noted that in order to simplify the disclosure and thus facilitate a more complete understanding of the embodiment, the relays, relay contacts and other electromechanical devices shown in FIGS. 2 through 4 have been given systematic designations. The number preceding the letters of each device correspond to the figure in which the control circuit of the device is shown. Thus, the coil of relay 2RT is shown in FIG. 2. Each relay contact, either make, break or transfer, is shown with its specific contact number preceded by the designation of the relay to which it belongs. For example, the notation 2RT-1 indicates contact number 1 of relay 2RT, the coil of which is shown in FIG. 2.

INTRODUCTION

The present invention is illustrated in an automatic switching system wherein common control circuits are employed to control the establishment of calls through a switching network. One such system is disclosed in the A. J. Busch U.S. Pat. No. 2,585,904, issued Feb. 19, 1952. It is to be understood that the present invention is not, however, limited to use in a telephone system of this type but may be utilized in other types of switching systems.

The invention is described herein as being embodied in a telephone system of the type disclosed in the cited Busch patent. The invention is particularly concerned with apparatus in marker circuit 8, queue register 12, outgoing trunk 4, processor and store circuit 7 and busy-idle detector 13, which are represented by the blocks shown with heavy lines in FIG. 1. The other equipment units of the Busch system are neither shown nor described in detail herein except where necessary for a complete understanding of the invention. The cited Busch patent may be consulted for a complete understanding of the construction and operation of other components of the Busch disclosure.

For purposes of illustration, it is intended that the apparatus of line link frame (LLF) 2, trunk link frame (TLF) 3, outgoing trunk 4, originating register 6 and marker 8 be similar to the corresponding apparatus disclosed in the Busch patent. It is further intended that processor and store (PAS) circuit 7 may constitute any one of a number of configurations well known in the art operable to electrically record information in binary form at preselected address locations, each of which address locations is effective to provide the information stored therein on a destructive or a nondestructive read-out basis.

In order to facilitate an understanding of the invention, the description of the operation of the exemplary embodiment has been sub-divided into a general description portion designated 1.00 and a detailed description portion designated 2.00. Section 1.00 and its subsections describe the invention in general terms with respect to FIG. 1. Section 2.00 and its subsections describe the invention in detail with respect to FIGS. 2 through 4.

1.00 GENERAL DESCRIPTION

The interrelation and function of the equipment units of the exemplary embodiment will now be described with reference to FIG. 1, wherein the interconnection between circuit blocks has been designated by arrows to indicate the direction of circuit action.

For purposes of illustration, we shall assume that a subscriber at station S1 desires to place a call to a station which is located at a point not served by the same switching office. However, as will be more apparent from that which is contained hereinafter, the called station may be advantageously located at any switching office, including the switching office serving station S1.

1.1 Initiation of a Call

Figure 1:
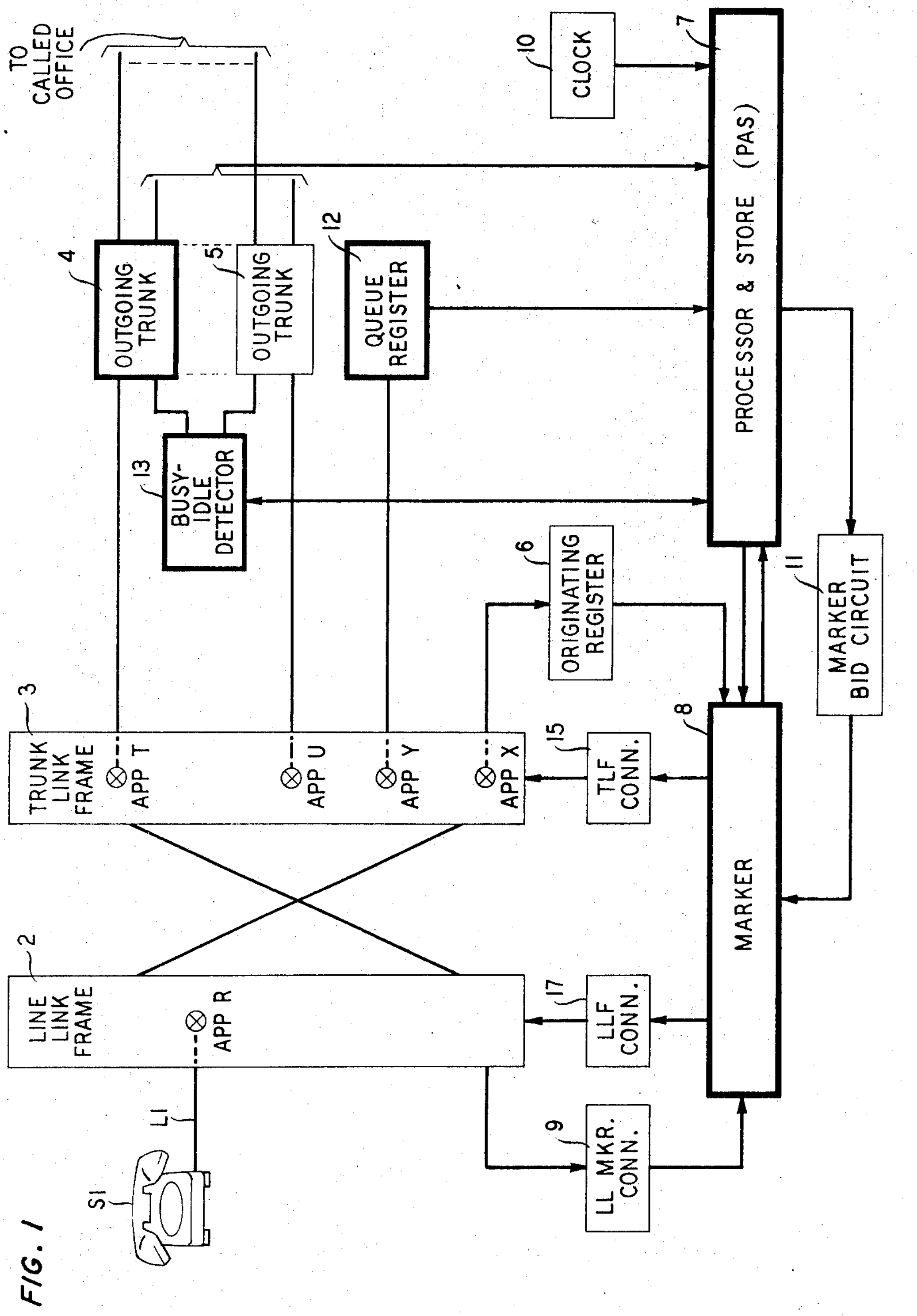
FIG. 1 is essentially a block diagram showing the interrelation of the exemplary embodiment of the invention.

Referring now to FIG. 1, when station S1 goes off-hook, marker circuit 8 is arranged, as described in the aforementioned Busch patent, to connect line link frame 2 appearance R with trunk link frame 3 appearance X such that digits transmitted from station S1 will be received in originating register circuit 6. As further set forth in the Busch patent, marker circuit 8 then causes the registration of the class of service and the calling line equipment location of station S1 in the originating register. The marker thereupon releases from the connection.

Dial tone is returned to the subscriber at station S1 from originating register 6 in the well-known manner upon completion of the aforesaid linkage. At this point we shall assume that the subscriber at station S1 dials (or key pulses) the digits corresponding to the directory number of the called station. These digits are stored in the originating register and upon completion of dialing a completing marker is seized in order to process the call further.

The originating register transfers to the completing marker the line equipment location and the class of service of station S1, together with the dialed directory number of the called stations. The originating register thereupon releases from the connection. The marker, as described in the Busch patent, then performs the necessary route translations in preparation for the completion of the call.

1.2 Blockage of the Call - All Trunks Busy

The marker, after determining the preferred route from the calling office to the called office, attempts to seize an idle outgoing trunk associated with that route. In the event all the trunks of the preferred route are busy, the marker route advances and attempts to select an idle trunk in an alternate route. When all routes have been found to be busy the marker is arranged to hunt for an idle queue register, such as queue register 12. Upon ascertaining the idle status of such a register, the marker thereupon, in the manner to be detailed hereinafter, seizes PAS 7 and transfers thereto the call completion information which includes the route number, line equipment location, the class of service of the calling station, the dialed directory number of the called station and the number of the selected queue register. This information is stored in PAS 7 in a temporary storage list for further processing in the manner to be detailed hereinafter. A linkage between the selected queue register and the calling subscriber also is established by the marker which thereupon releases from the connection.

1.3 Interrogation of the Calling Subscriber

Upon the establishment of a link between the queue register and the calling subscriber, a tone is transmitted from the queue register to the subscriber which we shall assume is recognized by the subscriber as a signal that the call cannot be completed immediately. The calling subscriber thereupon, in the manner to be detailed hereinafter, indicates to the queue register whether the call should be stored in the queue register for automatic reinitiation or whether the call is to be abandoned at this time.

1.4 Recording a Blocked Call in the Hi-Q List

The queue register, upon detecting an affirmative response from the calling subscriber signifying a desire to utilize the automatic recall facilities, transfers to the PAS 7 a record signal. The PAS 7, in the manner to be detailed hereinafter, transfers the information which previously had been temporarily recorded therein to a permanent high queue (Hi-Q) list. A negative response by the calling subscriber to the interrogation signal from the queue register results in the removal of the call completion information from the temporary storage list in PAS 7. We shall assume for purposes of simplicity, that the subscriber at station S1 thereupon returns the station to an on-hook condition.

1.5 Reinitiation of a Call from the Hi-Q List

Assuming now that an outgoing trunk associated with the route of a queued call becomes idle, busy-idle detector 13 recognizes such a condition and signals the PAS 7 that a trunk is available. The PAS 7 utilizes the route of the available trunk, as transmitted from the busy-idle detector, as an address location in the Hi-Q list. The PAS 7 thereupon bids for an idle completing marker and transfers thereto the call completion information contained at the selected memory location. The marker, in the manner discussed previously, proceeds to select an available outgoing trunk of the preferred route. Upon selection of such a trunk, a linkage is established between the calling subscriber's line terminals and the selected trunk. Concurrently, the marker transfers to the PAS 7 the route and trunk number of the selected trunk together with the line equipment location, class of service and called directory number associated with the calling subscriber. The call then progresses toward completion in the well-known manner as described in Busch.

Since the calling subscriber is currently on-hook, the outgoing trunk is arranged to transmit ringing tone potential to the calling subscriber as an indication that the previously queued call is now in the process of being automatically reestablished to the called station. The calling station going off-hook in response to ringing tone potential applied to the line enables a communication path to be established to the called station in the normal manner.

1.6 Blockage of the Call - Called Station Busy

For purposes of illustration, it will now be assumed that the called station is engaged in communication with some other subscriber and is therefore unavailable for subsequent incoming calls. In this situation, busy tone is returned to the calling subscriber over the outgoing trunk. The outgoing trunk, upon detecting this busy tone, transfers to the PAS 7 the route and trunk number of the associated trunk. Accordingly, the PAS 7 is arranged to correlate the route and trunk number of the outgoing trunk with the calling line equipment location and associated call completion information in the manner to be more fully detailed hereinafter. When the calling line identity is obtained, the PAS 7 transfers this information to the marker. Upon receipt of this number the marker proceeds to establish a linkage between the calling subscriber and a queue register. As discussed previously, the queue register interrogates the calling subscriber so as to determine whether the attempted call should be placed in the queue or whether the call is to be abandoned at this time. In response to an affirmative reply by the calling subscriber the call completion information is recorded in the PAS 7. Since the call has not been completed because of the off-hook condition of the called station, as opposed to the situation when the call is blocked due to the busy condition of the switching system, the call completion information is recorded in a Low-Q list for subsequent recall under periodic clock control in the manner to be more fully described hereinafter.

It should be noted at this point that the PAS 7 also could be arranged to store call completion information in other lists under control of separate clocks for situations where the call becomes blocked at points other than the calling office or the called station; as, for example, in an intermediate switching office. Recall from each list then would be independently controlled so as to further optimize the call completion process.

2.0 Detailed Description

The following text will describe the embodiment of the invention in detail with reference to FIGS. 2 through 4. A cursory examination of these figures will reveal that certain relay contacts and relay designations have been enclosed in parentheses. The parenthetical symbol has been employed to facilitate a clear understanding of the invention by indicating that the apparatus which is enclosed therein is shown more fully in the earlier cited Busch disclosure. Relay designations and contact designations which are unique to the instant embodiment are not enclosed in parentheses and, as will be more apparent from that which is contained hereinafter, are shown in complete detail.

We shall assume as hereinbefore set forth that station S1 is arranged for queuing service. We shall further assume that a subscriber at station S1 desires to place a call to a station which is located at a point not served by the same switching office.

2.1 Initiation of Call

Upon an off-hook condition of the subset at station S1, marker circuit 8 is seized by line link marker connector 9 in a manner identical to that set forth in detail in the earlier cited Busch patent. Since marker circuit 8 is seized by line link marker connector 9 only in conjunction with a dial tone request, marker circuit 8 prepares to obtain that information necessary for the completion of a dial tone connection, namely, the class of service designation of the off-hook station together with the line equipment location numbers of the associated line.

As set forth in the A. J. Busch patent, upon receiving the aforesaid information the marker circuit 8 establishes a linkage (connection 218, FIG. 2) between the line equipment location associated with the calling station and an available originating register such as originating register 6 on trunk link frame 3. The marker 8 thereupon transfers to originating register 6 the line equipment location number together with the class of service designation of station S1. Having recorded the aforesaid information, as well as other data pertinent to subsequent handling of the call in originating register 6, marker 8 releases so as to be available to serve other calling connections.

Turning now to FIG. 2, upon the establishment of a linkage connection between the originating register 6 and the calling subscriber at station S1, a continuous communication path is extended from the subset of station S1 through to digit register 203. Dial tone is returned in the well-known manner to signify that the calling station may commence transmission of the directory number corresponding to the called subscriber. The subscriber thereupon dials or key pulses the station directory digits of the called subscriber. These digits are registered in digit register 203 in the well-known manner. Upon completion of the dialing interval the originating register 6 calls in a completing marker, such as marker 8, and transfers thereto the class of service and the line equipment location numbers of the calling station S1 together with the registered directory number of the called station. Upon receipt of the call completion information from the originating register 6 the marker 8 performs the necessary route translations and prepares to establish a trunk connection to the called office.

2.2 Blockage of the Call-All Trunks Busy

The marker, after determining the preferred trunk route between the calling office and the called office, attempts to seize an idle outgoing trunk associated with that route. In the event that the trunks of the preferred route are busy, the marker route advances in the well-known manner and attempts to select an idle trunk in an alternate route. When all routes have been found to be busy, the marker is arranged to enable the (RTN) relay. The enabling of relay (RTN) causes the marker to search for an idle queue register, such as the queue register 12. Upon ascertaining the idle status of such a register, the associated queue register number is stored in queue register number circuit 213 in marker 8. Concurrent with this operation ground is extended via enabled make contact (RTN-10) and released transfer contact 2LW-2 over lead Q0 to processor and store PAS 7 input-output registers FIG. 3 via cable 232. As noted earlier, it is intended that PAS 7 may comprise any one of a number of configurations of memory circuits well-known in the art operable to electronically store information at particular address locations which information may be obtained subsequently from that address location on a destructive or nondestructive read-out basis.

Turning now to FIG. 3, the aforesaid ground potential on cable 232 indicates to PAS 7, as well-known in the art, that a write function in Table A is required. Concurrent with the enabling of the Q0 lead a plurality of leads are extended via cable 232 to input-output registers in PAS 7. An examination of the respective designations of these leads will reveal that they constitute five basic groups of information. The first group of information is the queue register number of the selected queue register which will serve as an address location in memory; the second group of information is the route number of the preferred route between a calling office and a called office; the third group of information is the line equipment number of the calling station; the fourth group of information is the dialed directory number of the called station; and the fifth group of information is the class of service associated with the calling subscriber. Thus PAS 7 writes in Table A the call completion information associated with the subscriber at station S1, the importance of which will be more fully appreciated from that which is contained hereinafter.

2.3 Interrogation of the Calling Subscriber

Returning now to FIG. 2, the marker 8, upon selecting an idle queue register, establishes a linkage connection 219 through the switching network from the calling subscriber to the queue register 12. The enabling of relay (RTN) in marker 8 also provides a ground to queue register 12 via released break contact 2LW–1 and enabled make contact (RTN–11) to operate relay 20N in an obvious manner. Relay 20N operating, locks operated from ground through enabled make contact 20N–1 and released break contacts 2Q3–3 and 2QT–1. The enabling of relay 20N also connects tone source 220, which advantageously may be arranged in any one of the well-known circuit configurations operable to provide distinctive tones on a pair of wires, to the calling subscriber S1 via capacitors 2C1 and 2C2 and enabled make contacts 20N–2 and 20N–3 over the T and R leads and the previously established linkage connection 219. Concurrent with the transmission of tone source to subscriber S1, relay 20N provides a ground via enabled make contact 20N–6 and released break contact 2Q3–1 to to timer 221 which may comprise any one of the circuit configurations well known in the art for providing ground at the output a certain interval of time after ground is applied to the input. During this interval relay 2QT remains normal.

Digressing momentarily, we shall assume at this point that the calling subscriber at station S1 recognizes that the transmitted tone is an indication that the call cannot be completed at this time. We shall further assume that the calling subscriber understands that a switchhook flash at this point is an indication that the call should be queued and automatically reestablished under control of the switching system. The calling subscriber further knows that by replacing the handset in the on-hook condition at this point the call will be abandoned in the conventional manner.

Returning now to FIG. 2, relay 2QS operates through the subscriber's loop immediately upon the establishment of a linkage connection between the queue register and subscriber S1 and provides an operate ground for relay 2Q1 from enabled make contact 2QS–1 and released break contact 2Q1–1 through the winding of relay 2Q1 to battery via resistor 2QR1. It should be noted at this point that relay 2Q2 remains unoperated due to the shunt ground from enabled make contact 2QS–1 and released break contact 2Q2–2 to the battery side of relay 2Q2. Relay 2Q1 locks operated to ground via enabled make contacts 20N–5 and 2Q1–1.

The calling subscriber going on-hook opens the subscriber loop thereby causing relay 2QS to release in an obvious manner. The release of relay 2QS removes the shunt path from relay 2Q2, thereby enabling the operation of relay 2Q2 from ground via enabled make contact 2Q1–2 and released break contact 2Q2–1 and through the winding of relay 2Q2 to battery via resistor 2QR2. Relay 2Q2 locks operated via enabled transfer contact 2Q2–1 and enabled make contact 2ON–2. As discussed previously, when the calling subscriber desires to place the call in queue the switchhook is immediately returned to the off-hook condition thereby again enabling relay 2QS. Accordingly, ground from enabled make contact 2QS–1 and enabled make contact 2Q2–2 shunts down relay 2Q1 in an obvious manner. Relay 2Q1 releasing while relay 2Q2 remains operated extends a ground via released break contact 2Q1–3 and enabled make contact 2Q2–3 to operate relay 2Q3 in an obvious manner. The enabling of relay 2Q3 prevents timer 221 from operating via enabled break contact 2Q3–1 and opens the hold path of relays 20N via break contact 2Q3–3. The operation of relay 2Q3 also provides a ground via enabled make contact 2Q3–2 over the Q2 lead to PAS 7 via cable 231.

Digressing momentarily it should be noted that in the event the calling subscriber remains on-hook relay 2Qs remains normal which maintains relay 2Q1 operated thereby preventing the operation of relay 2Q3 via released break contact 2Q1–3. Accordingly, timer 221, after the preset time, enables the operation of relay 2QT thereby providing a ground on lead Q3 to PAS 7 via cable 231. Upon receipt of a ground on the Q3 lead, PAS 7 is arranged to remove and destroy the information stored in Table A under the address location of the associated queue register as transmitted from the queue register to PAS 7 over cable 231, leads ITAO through ITNN.

Summarizing briefly at this point, marker 8, upon ascertaining the busy condition of all trunks between the calling office and the called office, bids for an available queue register. The marker transfers the call completion information associated with the calling subscriber to PAS 7 for storage in Table A under the address location of the selected queue register. Concurrent with this operation the queue register provides an interrogation tone to the calling subscriber as an indication that the call cannot be completed immediately and receives from the calling subscriber an indication via a switchhook flash that the call is to be stored for automatic reinitiation or via a continuous on-hook signal that the call is to be abandoned.

2.4 Recording of a Call in the High Queue List

Turning again to FIG. 3, the PAS 7, upon receiving a ground via lead Q2, and cable 231 which as previously discussed signifies an affirmative response to the interrogation tone, transfers the information previously stored therein in Table A under the address location of the associated queue register to Table B under the address location of the route number of the called station. Accordingly, the call completion information associated with the call from the subscriber at station S1, which was blocked because of the unavailability of an outgoing trunk of the proper route, is now stored in the Hi-Q list Table B at the address location of the route number of the preferred route of the blocked call. The purpose for storing this information in Table B addressable by the preferred route number will become more apparent from that which is to follow.

2.5 Reinitiation of a Call from the High-Queue Line

Turning now to FIG. 4, whenever an outgoing trunk becomes available in a particular route, the ATB relay associated with that route releases in busy-idle detector 13 (namely, relay 4ATB operates at this time). Accordingly, ground is provided via released break contacts 4ATB–1 and 4ACK–1 to operate relay 4ACK to battery through resistor 4AR. The enabling of relay 4ACK extends a ground via enabled make contact 4ACK–2 over lead ATB and cable 421 to PAS 7, FIG. 3. PAS 7 is arranged to thereupon accept from busy-idle detector 13 route number register 405 the route numbers associated with the available trunk. PAS 7 acknowledges receipt of this information by returning a ground over lead ACK to busy-idle detector 13 which shunts the 4ACK relay. If other trunks are available at this time relay 4ACK is reenabled via released break contact 4ATB–1. Relay 4ACK reoperating provides another ground to PAS 7 as an indication that another trunk is available to process a queued call.

Turning now to FIG. 3, the PAS 7, upon receipt of the route number of the available trunk, searches Column A of Table B at the address location of the available route number for call completion information stored thereat as previously discussed. The correlated call completion information is then read out of memory from Table B and transferred to the input-output registers. Marker bid circuit 11, which may be any one of the well-known circuit configurations operable to seize an idle one of a group of markers, is thereupon activated. Upon selection of an available marker, such as marker 8, the call completion information previously read out of Table B is transferred from the input-output registers of PAS 7 to the marker 8 via cable 233.

Turning now to FIG. 2, concurrent with the storage of this information in marker circuit 8 relay 2RT is enabled from ground over cable 233 from PAS 7. Relay 2RT locks operated from ground through enabled make contacts (ON–11) and 2RT–1. The operation of relay 2RT extends a ground on lead RT to the selected outgoing trunk via enabled make contact 2RT–2, the purpose of which will be more fully understood from that which is contained hereinafter.

Since at this point marker circuit 8 contains all the information necessary to complete the call between the subscriber at station S1 and the previously called subscriber, the marker functions in the well-known manner and proceeds to select an available outgoing trunk such as trunk 4, and to establish a linkage connection between the line appearance of station S1 and the selected trunk. Concurrent with the establishment of this linkage relay (TT) in marker 8 operates as an indication that a trunk of the proper route has been selected. A ground is thereby extended via enabled make contact (TT–10) over lead Q1 and cable 232 to PAS 7.

Turning now to FIG. 3, upon receipt of ground on lead Q1 PAS 7 is arranged, in the manner previously discussed, to store in Table D, of the address location corresponding to the selected route number, the call completion information also transferred thereto from marker 8 via cable 232. The purpose for the storage of this information addressable by the route number of selected outgoing trunks will become more apparent from that which is contained hereinafter.

Turning again to FIG. 4, since the calling subscriber of station S1 is currently on-hook the subscriber loop is open thereby maintaining relay (L) unoperated. Accordingly, ground on the RT lead from the marker to the selected trunk, as previously discussed, enables the 4RT relay via released transfer contact 4RT–3 and released break contact (L–10). Relay 4RT operating locks operated from ground through the now enabled transfer contact 4RT–3 and released break contact (L–10). The enabling of relay 4RT also applies ringing potential via ring tone source 404, which may be any one of the well-known circuit configurations operable to supply ringing potential, and enabled make contacts 4RT–1 and 4RT–2, capacitors (C3) and (C4) to the linkage connection between the outgoing trunk and the subscriber line. Ringing potential is thereby transmitted to the calling subscriber as an indication that the previously queued call is now in the process of being automatically reestablished to the called station. The calling subscriber upon going off-hook in response to the ringing potential applied to the line, enables the operation of relay (L) via the now closed subscriber loop. The enabling of relay (L) causes the release of relay 4RT via now enabled break contact (L–10) thereby removing ring tone source 404 from the transmission path via released transfer contact 4RT–1 and 4RT–2. The call thereupon proceeds toward completion in the manner set forth in Busch. When the called station goes off-hook in response to ringing potential applied to the associated line in the called office a communication path between the calling station and the called station is established.

Digressing again momentarily, in the event the calling subscriber does not respond to ringing potential applied to the line by the outgoing trunk, relay (L) therein remains unoperated. Timer 405, which may comprise any one of the well-known circuit configurations operable to provide a ground at the output a certain interval of time after ground has been removed from the input, thereupon operates relay 4ST via enabled break contact 4RT–4 and released make contact (L–11). The enabling of relay 4ST removes linkage holding ground via enabled break contact 4ST–2, thereby terminating the calling connection. Concurrently, operation of relay 4ST provides a ground to PAS 7, via cable 420 and lead ST. PAS 7 is arranged to thereupon remove from Table D the call completion information associated with the connected outgoing trunk and to transfer the information to Table C, thereby again queuing the call for future processing.

2.6 Blockage of the Call - Called Station Busy

Turning again to FIG. 4, in the event the called station is currently engaged in communication with some other subscriber, or is otherwise unavailable the switching system at the called office returns busy tone to the calling station over the T and R leads of the established communication path in the well-known manner. In this situation, busy tone also is received via capacitors 4C1 and 4C2 by busy tone detector 401 which may be advantageously arranged in any one of the well-known circuit configurations to detect busy tone on a pair of wires and to operate a relay in response thereto. Accordingly, upon detection of busy tone relay 4BSY is enabled. The enabling of relay 4BSY provides a ground via enabled make contact 4BSY–5 to timer 402 which is arranged in any one of the well-known circuit configurations to provide a ground at the output a preselected interval after ground is applied to the input. The enabling of relay 4BSY also extends a ground via enabled make contact 4BSY–1 and lead BSY over cable 420 to PAS 7.

Turning now to FIG. 3, PAS 7, upon receipt of ground on lead BSY via cable 420 from outgoing trunk 4 accepts the route number as transmitted over cable 420 via leads 2A0 and 2NN from the outgoing trunk as an address location in Table D so as to remove from memory the call completion information currently associated therewith. This information, as obtained from Table D, is transferred to Table C under the address location of the current time as obtained from clock 10. The purpose of the storage under the address location of the current time will become more apparent from that which is contained hereinafter. Accordingly, at this point Table C contains the route number, line equipment number of the calling station, the directory number of the called station, and the class of service of the calling station.

Returning now to FIG. 4, upon the lapse of a predetermined timed interval as determined by timer 402, relay 4BST operates, thereby removing the linkage holding ground from lead S via enabled break contact 4BST–1. Accordingly, the linkage connection between the calling subscriber and the outgoing trunk is terminated at this point.

It should be noted that numerous arrangements may be devised, other than the use of the connected outgoing trunk, for the detection of busy tone on the established connection. For example, the busy tone detector could be designed into a special queue trunk having line link and trunk link frame appearances. The queue trunk could then be interposed for control purposes by the marker between a calling subscriber and a selected outgoing trunk. This special trunk also could be arranged to simplify the calling subscriber interrogation procedure on calls involving selected outgoing trunks, as previously described, by providing interrogation tones directly to the calling line. A linkage connection between the queue register and the calling subscriber would therefore not be necessary with such an arrangement.

2.7 Reinitiation of a Call from the Low–Q List

Turning now to FIG. 3, as discussed previously, a call blocked because of the off-hook condition of a called station is stored in the Low–Q list, Table C of PAS 7 under the address location corresponding to the time the call was blocked. PAS 7 is arranged to continually receive updated time information from clock 10 and to interrogate the Low–Q list, Table C to determine whether a preset interval has elapsed between the time contained in Column A and the now current time. Upon such determination PAS 7 removes the associated completion information from Table C and, as discussed previously, bids for an available marker, such as marker 8, via marker bid circuit 11 and transfers thereto the route number, line equipment number of the calling subscriber, and the dialed directory number of the called subscriber together with the class of service information. Concurrent with the transfer of this information PAS 7 extends a ground via cable 233 to the selected marker, FIG. 3, to enable the 2LW relay therein. Relay 2LW operating, locks operated to ground via enabled make contacts (ON–10) and 2LW–3. The function of 2LW will be more fully appreciated from that which is contained hereinafter.

Turning again to FIG. 2, upon receipt of the call completion information marker 8 contains all of the information necessary to again attempt to complete the call. In the manner described previously for calls removed from the Hi–Q list, an available trunk to the called office is selected, ringing potential is applied to the calling subscriber line and the call progresses in the manner previously discussed, thereby resulting in communication between the calling party and the called party in a most expeditious manner.

Digressing momentarily, it should be noted that although in the instant embodiment ringing tone is transmitted to the calling subscriber prior to the establishment of a connection forward to the called stations, the system also could be arranged to establish the complete connection prior to ringing either the calling or the called stations.

Returning now to FIG. 2, in the event that outgoing trunks of the proper route are not available at this time, the marker route advances in the manner previously described and enables the (RTN) relay. However, since the marker is currently operating from information received from the Low–Q list, Table C of PAS 7, relay 2LW is operated as previously discussed. Accordingly, ground is not extended to the queue register because of enabled break contact 2LW–1 and the marker does not select an idle queue register at this point.

Digressing again momentarily, the reason that the selection of a queue register is inhibited at this point is that no further interrogation is necessary because the current call was initiated by the Low–Q list which is an indication that the subscriber has already signified that automatic call completion is desired. Accordingly, the attachment of a queue register would be confusing since the primary purpose of the queue register is to interrogate the calling subscriber to determine whether the call is to be queued or abandoned.

Returning now to FIG. 2, the enabling of relay (RTN) with relay 2LW operated extends a ground from enabled make contact (RTN–10) and 2LW–2 via lead Q4 and cable 232 to PAS 7 input-output registers, FIG. 3. Ground on the Q4 lead to PAS 7 is an indication that the call completion information stored in marker registers 214, 212, 211 and 210 should be transferred to the Hi–Q list, Table B in PAS 7 for storage under the address location of the route number in the manner previously described. Upon completion of this transfer the marker is released and the call completion information is again queued in memory, this time waiting for a trunk to the called office to become available.

2.8 Conclusion

While the equipment of this invention has been shown in a particular embodiment wherein call completion information is stored in one list of an auxiliary memory when the call is blocked due to the unavailability of a trunk to the called station and stored in another list when busy tone is detected by a connected trunk and wherein the call is automatically completed dependent upon the reason for the blockage, it is to be understood that such an embodiment is intended only to be illustrative of the present invention and numerous other arrangements may be devised by those skilled in the art without departing from the spirit and scope of the invention.

We claim:

1. In a switching system having a plurality of stations, a switching network, and a plurality of communication paths extending from said network, the combination comprising:

control means responsive to calling information for establishing connections from said stations through said network to selected ones of said paths;

first means for storing calling information on blockage of a call by failure of said network to establish a connection to a communication path;

at least one other means for storing said calling information on blockage of a call subsequent to said connection to said communication path;

means controlled by said first means for enabling said control means in response to the subsequent availability of said communication path; and means controlled by said other means for reenabling said control means in a predetermined interval of time.

2. In a communication system having a plurality of calling and called subscribers:

switching network means;

a plurality of outgoing trunk means, processor means including first and second memory means;

control means responsive to call processing information for establishing connections through said network means, said processor means and said control means including;

means for placing said call processing information in said first memory means if an outgoing trunk means is not available and means for placing said call processing information in said second memory means if an outgoing trunk means is available but the connection is not completed to the called subscriber;

means for detecting the busy-idle condition of said trunk means;

clock means; and memory readout means for transferring to said control means said call processing information from said first memory means under control of said busy-idle detection means and from said second memory means under control of said clock means.

3. In a communication system, the combination of claim 2 further comprising means responsive to said transfer of said call processing information for enabling said control means to establish a connection through said switching network in accordance with said call processing information.

4. In a telephone system:

a plurality of lines;

a memory;

trunk means operable to interconnect calling and called ones of said lines;

means operable to interrogate a calling one of said lines and to receive a response therefrom;

control means for selecting said trunk means in response to information transmitted from calling ones of said lines;

said control means including means jointly operable in response to signals from a calling one of said lines and the unavailability of said said trunk means for enabling said interrogation means;

means in a selected one of said trunk means operable in response to an inability to complete a connection from a calling one of said lines to a called one of said lines for enabling said interrogation means; and means jointly responsive to the enabling of said interrogation means and receipt of a response from said one calling line for storing said transmitted information in said memory.

5. In a telephone system, the combination of claim 4 further including means jointly responsive to the enabling of said interrogation means and the absence of a response from said one calling line for abandoning said call.

6. In a telephone system, the combination of claim 4 wherein said memory comprises a plurality of lists and wherein said control means further includes means for directing said storage of said information in one said list whenever a trunk is unavailable and means for directing said storage of said information in another said list when said trunk means is unable to complete a connection to a called one of said lines.

7. In a telephone system, the combination of claim 6 further comprising means for detecting the availability of said trunk means;

clock means for providing periodic clock pulses; and readout means responsive to a detected available trunk means for transferring said information stored in said one list to said control means and responsive to certain of said periodic clock pulses for transferring said information stored in said other list to said control means.

8. In a communication system having a plurality of switching networks and a plurality of lines extending from each of said networks, the combination comprising:

a processor including a first memory and a second memory;

means for receiving call completion information from any of said lines;

means for completing connections from a calling one of said lines to a called one of said lines in accordance with said received call information;

means responsive to the inability of a calling network connected with a calling one of said lines to complete a connection to a called network connected to a called one of said lines for storing the associated call completion information in said first memory;

means responsive to the inability of a called network connected to a called one of said lines to complete a connection to said called line for storing said call completion information in said second memory;

means for removing said stored call completion information from said first memory when said calling network is available to complete the associated connection;

means for removing said stored call completion information from said second memory a predetermined timed interval after said storage of said information and means responsive to removal of said information from either of said memories for enabling said connection completion means in accordance with said removed call completion information.

9. In a communication system, the combination of claim 8, further comprising:

subscribers' stations connected to said lines, means concurrently operable with said storage means for providing an interrogation tone to a subscriber station connected to said calling line; and means controlled by said connected subscriber station for inhibiting said storage of said call completion information.

10. In a communication system, the combination of claim 9 further comprising means operative upon the enabling of said completion means in response to said information being read from said memories for inhibiting said interrogation tone.